United States Patent Office 2,748,100
Patented May 29, 1956

2,748,100

STABILIZATION OF A SULFUR VULCANIZABLE RUBBER WITH A MIXTURE OF 6- AND 8-ALKOXY DIHYDROTRIALKYLQUINOLINES

James O. Harris, St. Albans, and Wendell P. Metzner, Charleston, W. Va., assignors to Monsanto Chemical Company, St. Louis, Mo., a corporation of Delaware No Drawing. Application May 23, 1952, Serial No. 289,678

20 Claims. (Cl. 260—45.8)

This invention relates to the preservation of rubber and particularly to the prevention of exposure cracking. The majority of rubbery polymers under strain are subject to exposure cracking. The cause has been attributed to many factors in the past, but it has been shown that ozone is one of the major causes. This invention is particularly concerned with the inhibition of the deleterious effects of ozone.

It has long been known that the 6-alkoxy dihydroquinolines are useful anti-degradation agents for rubber and it has been further observed that these agents inhibit the attack of ozone on vulcanized rubber compositions. The position of the alkoxy group is very important. For example, it is well known that the 8-alkoxy dihydroquinolines are essentially ineffective for improving the age-resistance of rubber. Similarly, these materials do not significantly retard the deleterious action of ozone.

In accordance with the present invention it has now been discovered that admixtures of 6- and 8-alkoxy dihydroquinolines provide excellent protection to rubber stocks especially as regards exposure cracking. This discovery is of considerable economic importance since the commercial methods for preparing the alkoxy dihydroquinolines ordinarily result in the formation of the mixed 6- and 8-alkoxy isomers. They are prepared by condensing the alkoxy anilines with a ketone, and the former are in turn derived from nitrochlorobenzene by alkoxylation and reduction. However, it is not possible to nitrate chlorobenzene without forming a substantial proportion of the ortho isomer. For the purposes of this invention separation of the isomers is unnecessary. Surprisingly, a combination of the isomers containing a major proportion of the acetone derivative of p-alkoxy aniline is equivalent to the reaction product of the pure p-alkoxy aniline and acetone.

It is now generally accepted that the condensation products of primary aromatic amines and methyl ketones are substituted dihydroquinolines. For example, the following structure has been assigned for the nucleus of the resulting dihydroquinolines

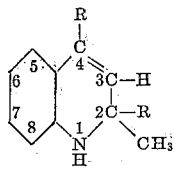

where R represents an alkyl radical. The anti-degradation agents of this invention contain an alkoxy group in the 6- and 8- positions. Suitable examples are methoxy, ethoxy, propoxy, isopropoxy, butoxy, and amoxy.

The methods for carrying out the condensations in the presence of suitable dehydration catalysts such as iodine, bromine, benzene sulfonic acid, toluene sulfonic acid and the like, are well known. For example condensing one mole of para-phenetidine and two moles of acetone at 140–145° C. by passing acetone into para-phenetidine in the presence of 2.0–2.5% iodine on the amine resulted in a mobile liquid product believed to be essentially 6 - ethoxy-1,4-dihydro-2,2,4-trimethylquinoline, approximately 82% of which distilled at 123–125° C./2 mm. Similarly, condensation of ortho-phenetidine in the same manner produced a mobile liquid product identified as a dihydroquinoline and believed to be 8-ethoxy-1,2-dihydro-2,2,4-trimethylquinoline, B. P. 110–112° C./2 mm. In any event by 6- and 8-alkoxy dihydrotrialkylquinolines are meant the condensation products of ortho and para alkoxy anilines and ketones in the presence of a suitable condensation catalyst. The invention is not limited to any assumptions regarding the precise structure of the reaction products. Other examples of 8-alkoxy dihydrotrialkylquinolines are 8-methoxydihydrotrimethylquinoline, B. P. 112–113° C./2 mm. and 8-butoxydihydrotrimethylquinoline. These products were prepared by condensing the ortho-alkoxy anilines in the presence of iodine catalyst in the manner described for para-phenetidine. Neither product significantly retarded the attack of ozone on rubber when used in the absence of the 6-isomer.

The isomers may be admixed in any proportion with resultant advantage, but it is preferred that the 6-isomer predominate. Particularly good results have been obtained with proportions of about 65% of the 6-isomer and 35% of the 8-isomer. The mixtures may be prepared by mixing the separate components or preferably an admixture of the alkoxy anilines may be condensed with the ketone.

As a specific embodiment of the invention a rubber base composition was compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Sulfur | 2.5 |
| Saturated hydrocarbon softener | 3.0 |
| N-cyclohexyl-2-benzothiazolesulfenamide | 0.8 |

To the base composition so compounded there was added essentially an admixture of 6- and 8-ethoxy dihydrotrimethylquinoline prepared by condensing at atmospheric pressure acetone and an admixture of 64 parts by weight para-phenetidine and 36 parts by weight orthophenetidine in the presence of 2.0–2.5% iodine and heating the product under 10–15 mm. pressure to about 100° C. This was compared to another composition containing 6-ethoxy dihydrotrimethylquinoline prepared in exactly the same manner from pure para-phenetidine and acetone and also to the base composition containing no added ingredient. The rubber compositions so compounded were cured by heating in the usual manner in a press for 30 minutes at 142° C. Since evaluation under static conditions is not indicative of the service obtained with many types of rubber articles which must withstand flexing, the vulcanized compositions were evaluated under dynamic conditions in an atmosphere containing a definite concentration of ozone. Samples of the stocks were cured in the form of a belt ½" wide, ¼" thick and 5⁵⁄₁₆" diameter and mounted on 1" diameter shafts. The ozone concentration was kept at 20–30 parts per hundred million throughout the test and the shafts rotated at 75 R. P. M. In this manner a momentary elongation through a range of 0–20% was provided at any portion of the test specimen passing over the shaft. The experimental test specimens were compared visually at various intervals noting the extent of cracking. The stock to which no preservative was added lasted only 8 hours before it began to crack. After this time it cracked very rapidly. A stock which is severely cracked has no service life remaining in terms of the useful life of a rubber article and where the cracking is designated as extremely severe the degradation is well beyond even this point. The results of the tests are summarized below:

Table I

| Material Added to Base Stock | Amt., Parts by Weight | Surface Cracking after Flexing in Ozone for— | |
|---|---|---|---|
| | | 24 hrs. | 48 hrs. |
| None | | extremely severe. | |
| 6-Ethoxy dihydrotrimethylquionline | 1.5 | none | slight. |
| Admixture of 6- and 8-ethoxy dihydrotrimethylquinoline. | 1.5 | ---do--- | Do. |

As further specific embodiments of the invention a rubber base stock was compounded comprising:

|   | Parts by weight |
|---|---|
| GR-S 100 | 100.0 |
| Carbon black | 50.0 |
| Zinc oxide | 5.0 |
| Stearic acid | 2.0 |
| Sulfur | 1.75 |
| Saturated hydrocarbon softener | 10.0 |
| N-cyclohexyl-2-benzothiazolesulfenamide | 1.5 |

The preservatives described in the foregoing tests were added to this base composition and the stocks evaluated as described. The stocks were cured by heating 60 minutes at 144° C. Again the stock containing no preservative cracked rapidly after 8 hours exposure and was too poor to test after 24 hours.

Table II

| Material Added to Base Stock | Amt., Parts by Weight | Surface Cracking after Flexing in Ozone for— | | |
|---|---|---|---|---|
| | | 24 hrs. | 48 hrs. | 72 hrs. |
| None | | extremely severe. | | |
| 6-Ethoxy dihydrotrimethylquinoline. | 3.0 | none | none | slight. |
| Admixture of 6- and 8- ethoxy-dihydrotrimethylquinoline. | 3.0 | ---do--- | ---do--- | Do. |

As further specific embodiments of the invention another series of tests were carried out employing the base stock compounded from smoked sheets described above. The preservatives included those employed in the foregoing tests and the curing and evaluation were identical. It will be appreciated that the extent of cracking of the same stock after a given number of hours exposure differs when the tests are carried out at different times but by reference to the control stocks incorporated in each series the relative effectiveness of the preservative agents can be fixed with confidence. The results in this series of tests are summarized in Table III. The 6-ethoxy dihydrotrimethylquinoline and the admixture of the 6- and 8-ethoxy isomers contained in the first two stocks following the base stock are the same products employed in the tests previously described. The product in the next stock in this series is an admixture of 64% 6-ethoxy dihydrotrimethylquinoline and 36% 8-ethoxy dihydrotrimethylquinoline prepared by separately condensing pure para-phenetidine and acetone and pure ortho-phenetidine and acetone, purifying the products by fractionation under reduced pressure and admixing in the stated proportions. For purposes of comparison data are included for the 8-ethoxy dihydrotrimethylquinoline, B. P. 110–112° C./2 mm., 6-methoxy dihydrotrimethylquinoline, B. P. 118° C./1.5 mm., and 8-methoxy dihydrotrimethylquinoline, B. P. 112–113° C./2 mm. It will be noted that although neither of the 8-substituted isomers have significant effect, the mixed isomers are equivalent to either of the 6-isomers.

Table III

| Material Added to Base Stock | Amt., Parts by Weight | Surface Cracking after Flexing in Ozone for— | | |
|---|---|---|---|---|
| | | 40 hrs. | 64 hrs. | 256 hrs. |
| None | | slight | slight | extremely severe. |
| 6-Ethoxy dihydrotrimethylquinoline. | 3.0 | none | none | very slight. |
| Admixture of 6- and 8-ethoxy dihydrotrimethylquinoline from mixed phenetidines. | 3.0 | ---do--- | ---do--- | Do. |
| Admixture of 6- and 8-ethoxy dihydrotrimethylquinoline prepared by mixing the separately prepared isomers. | 3.0 | ---do--- | ---do--- | Do. |
| 6-Methoxy dihydrotrimethylquinoline. | 3.0 | ---do--- | ---do--- | none. |
| 8-Methoxy dihydrotrimethylquinoline. | 3.0 | very slight | very slight | extremely severe. |
| 8-Ethoxy dihydrotrimethylquinoline. | 3.0 | slight | slight | Do. |

In another series of tests illustrating further specific embodiments of the invention stocks were compounded containing an admixture of 6- and 8-methoxy dihydroquinoline. The latter was prepared by condensing an admixture of 64% para-anisidine and 36% ortho-anisidine with acetone in exactly the same manner as the 6-ethoxy and mixture of 6- and 8-ethoxy dihydrotrimethylquinoline employed in the tests described in Table I and the effectiveness compared thereto. Stocks were compounded from both the base stocks previously described and the stocks cured and evaluated for crack resistance as previously described. The results are summarized in Table IV.

Table IV

| Material Added to Base Stock | Amt., Parts by wt. | Surface Cracking after Flexing in Ozone | | | |
|---|---|---|---|---|---|
| | | Natural Rubber Base | | GR-S Base | |
| | | 8 hrs. | 24 hrs. | 8 hrs. | 24 hrs. |
| None | | slight | extremely severe. | slight | extremely severe. |
| 6-Ethoxy dihydrotrimethylquinoline. | 1.5 | none | very slight | none | very slight. |
| Admixture of 6- and 8-ethoxy dihydrotrimethylquinoline. | 1.5 | ---do--- | ---do--- | ---do--- | Do. |
| Admixture of 6- and 8-methoxy dihydrotrimethylquinoline. | 1.5 | ---do--- | ---do--- | ---do--- | Do. |

In the foregoing series of tests all of the protected stocks reached an end point of extremely severe cracking after 48 hours exposure, whereas the base stocks were in this condition after 24 hours. It will be noted that both mixed isomers were equivalent to the condensation product of pure para-phenetidine and acetone.

Co-pending application of Andrew Tomlin, Serial No. 256,366, filed November 14, 1951, discloses that the 6-alkoxy-dihydrotrimethylquinolines are very efficient stabilizers for butadiene-styrene copolymers. It has now been found that the mixtures of the present invention are equivalent thereto. They are efficient preservatives for butadiene-styrene copolymers and the vulcanized stocks prepared from the coagulums show resistance to exposure cracking. For example, 3 parts by weight on the dry copolymer content of the dihydroquinoline products employed for the tests described in Table I were added to GR–S latex free of preservative (Type III). The dihydroquinolines were added as emulsions and the copolymer then coagulated. The coagulums were then artificially aged by placing in a circulating air oven for 18 hours at 100° C. The hardness of the aged products was then measured by a Shore Durometer. The results are summarized below:

Table V

| Coagulum | Preservative | Hardness |
| --- | --- | --- |
| A | None | 82 |
| B | 6-Ethoxy dihydrotrimethyquinoline | 35 |
| C | 6- and 8-Ethoxy dihydrotrimethylquinoline | 35 |

In addition vulcanizable stocks were compounded from the coagulum comprising:

| | Parts by weight |
| --- | --- |
| Coagulum from GR–S latex | 100.0 |
| Carbon black | 50.0 |
| Saturated hydrocarbon softener | 10.0 |
| Zinc oxide | 4.0 |
| Stearic acid | 2.0 |
| Sulfur | 1.75 |
| N-cyclohexyl-2-benzothiazolesulfenamide | 1.2 |

The compositions were cured in the form of belts by heating 60 minutes at 144° C. as previously described and their resistance to cracking evaluated in an atmosphere containing ozone. In this case the stock compounded from the latex coagulated in the presence of the mixed isomers was actually more resistant to ozone attack than the product containing the condensate of para-phenetidine and acetone. The results are summarized below:

Table VI

| Coagulum from which stock was compounded | Surface cracking after Exposure to Ozone for— | | |
| --- | --- | --- | --- |
| | 40 hrs. | 88 hrs. | 112 hrs. |
| A | extremely severe | | extremely severe. |
| B | very slight | severe | severe. |
| C | do | slight | severe. |

The age resistance of natural rubber stocks containing the mixed isomers is comparable to that of stocks containing the 6-alkoxy dihydroquinolines, although the 8-alkoxy dihydroquinolines alone do not significantly increase the age resistance. As illustrative of the results obtained vulcanizable compositions were compounded from the base stock and the dihydroquinolines employed for compounding the stocks described in Table I.

| Stock | Material Added to Base Stock | Amount, Parts by Weight |
| --- | --- | --- |
| D | None | |
| E | 6-Ethoxy dihydrotrimethylquinoline | 1.0 |
| F | Admixture of 6- and 8-ethoxy dihydrotrimethylquinoline. | 1.0 |

The stocks were cured by heating in a press in the usual manner for 60 minutes at 135° C. Samples of the vulcanized products were then artificially aged by heating in a bomb for 3 hours at 121° C. and 80 pounds air pressure per square inch. The physical properties before and after aging are summarized below:

Table VII

| Stock | Modulus of Elasticity in lbs./in.$^2$ at Elongation of 300% | Tensile at Break in lbs./in.$^2$ | Ultimate Elongation, Percent |
| --- | --- | --- | --- |
| D (unaged) | 2,136 | 4,723 | 553 |
| E (unaged) | 1,950 | 4,530 | 565 |
| F (unaged) | 2,030 | 4,673 | 550 |
| D (aged) | | 1,423 | 290 |
| E (aged) | 1,990 | 2,246 | 360 |
| F (aged) | 2,066 | 2,443 | 363 |

The anti-degradation agents of this invention may be used for the preservation of different types of rubber than those particularly mentioned above. The mixtures as defined may be employed for the protection of natural rubber in its various forms, as for example latex, crepe, smoked sheets, gutta percha, balata, and cyclo rubbers. Similarly it is applicable to synthetic elastomers which can be vulcanized with sulfur, as for example butadiene polymers, methyl substituted butadiene polymers, copolymers of butadiene with styrene, natural rubber, divinyl benzene, acrylonitrile, acrylic acid, methacrylic acid and esters thereof and to the preservation of copolymers of polyisobutylene and a small proportion of a diolefin. These synthetic products are familiar under such trade names as GR–S, Buna S, Chemigum, Hycar, and Butyl rubber.

It is intended to cover all changes and modifications of the examples of the invention herein chosen for purposes of disclosure which do not constitute departures from the spirit and scope of the invention.

What is claimed is:

1. The process of improving the resistance to degradation and atmospheric cracking of a sulfur vulcanizable rubber which comprises incorporating therein an admixture of a 6-alkoxy dihydrotrialkylquinoline and an 8-alkoxy dihydrotrialkylquinoline obtained by the condensation of the alkoxyanilines and a ketone.

2. The process of improving the resistance to degradation and atmospheric cracking of a sulfur vulcanizable rubber which comprises incorporating therein an admixture of 6-ethoxy dihydrotrimethylquinoline and 8-ethoxy dihydrotrimethylquinoline obtained by the condensation of para and ortho phenetidine with acetone.

3. The process of improving the resistance to degradation and atmospheric cracking of a sulfur vulcanizable rubber which comprises incorporating therein an admixture of approximately 65% 6-ethoxy dihydrotrimethylquinoline and approximately 35% 8-ethoxy dihydrotrimethylquinoline obtained by the condensation of para and ortho phenetidine with acetone.

4. The process of improving the resistance to degradation and atmospheric cracking of a sulfur vulcanizable rubber which comprises incorporating therein an admixture of 6-methoxy dihydrotrimethylquinoline and 8-methoxy dihydrotrimethylquinoline obtained by the condensation of para and ortho anisidine with acetone.

5. The process of improving the resistance to degradation and atmospheric cracking of a sulfur vulcanizable rubber which comprises incorporating therein an admixture of approximately 65% 6-methoxy dihydrotrimethylquinoline and approximately 35% 8-methoxy dihydrotrimethylquinoline obtained by the condensation of para and ortho anisidine with acetone.

6. The process of improving the resistance to degradation and atmospheric cracking of a sulfur vulcanizable rubber which comprises incorporating therein an admixture of 6-isopropoxy dihydrotrimethylquinoline and 8-isopropoxy dihydrotrimethylquinoline obtained by the condensation of para and ortho isopropoxyaniline with acetone.

7. The process of improving the resistance to degradation and atmospheric cracking of a sulfur vulcanizable rubber which comprises incorporating therein an admixture of 6-butoxy dihydrotrimethylquinoline and 8-butoxy dihydrotrimethylquinoline obtained by the condensation of para and ortho butoxyaniline with acetone.

8. A vulcanized rubber composition possessing enhanced resistance to degradation and atmospheric cracking by having incorporated therein an admixture of a 6-alkoxy dihydrotrialkylquinoline and an 8-alkoxy dihydrotrialkylquinoline obtained by the condensation of the alkoxyanilines and a ketone.

9. A vulcanized rubber composition possessing enhanced resistance to degradation and atmospheric cracking by having incorporated therein an admixture of 6-ethoxy dihydrotrimethylquinoline and 8-ethoxy dihydrotrimethylquinoline obtained by the condensation of para and ortho phenetidine with acetone.

10. A vulcanized rubber composition possessing enhanced resistance to degradation and atmospheric cracking by having incorporated therein an admixture of approximately 65% 6-ethoxy dihydrotrimethylquinoline and approximately 35% 8-ethoxy dihydrotrimethylquinoline obtained by the condensation of para and ortho phenetidine with acetone.

11. A vulcanized rubber composition possessing enhanced resistance to degradation and atmospheric cracking by having incorporated therein an admixture of 6-methoxy dihydrotrimethylquinoline and 8-methoxy dihydrotrimethylquinoline obtained by the condensation of para and ortho anisidine with acetone.

12. A vulcanized rubber composition possessing enhanced resistance to degradation and atmospheric cracking by having incorporated therein an admixture of approximately 65% 6-methoxy dihydrotrimethylquinoline and approximately 35% 8-methoxy dihydrotrimethylquinoline obtained by the condensation of para and ortho anisidine with acetone.

13. A vulcanized rubber composition possessing enhanced resistance to degradation and atmospheric cracking by having incorporated therein an admixture of 6-isopropoxy dihydrotrimethylquinoline and 8-isopropoxy dihydrotrimethylquinoline obtained by the condensation of para and ortho isopropoxyaniline with acetone.

14. A vulcanized rubber composition possessing enhanced resistance to degradation and atmospheric cracking by having incorporated therein an admixture of 6-butoxy dihydrotrimethylquinoline and 8-butoxy dihydrotrimethylquinoline obtained by the condensation of para and ortho butoxyaniline with acetone.

15. The process of improving the resistance to degradation and atmospheric cracking of butadiene-styrene emulsion copolymer rubber which comprises incorporating into the latex thereof an admixture of a 6-alkoxy dihydrotrialkylquinoline and an 8-alkoxy dihydrotrialkylquinoline obtained by the condensation of the alkoxyanilines and a ketone.

16. The process of improving the resistance to degradation and atmospheric cracking of a butadiene-styrene emulsion copolymer rubber which comprises incorporating into the latex thereof an admixture of a major proportion of a 6-alkoxy dihydrotrialkylquinoline and a minor proportion of an 8-alkoxy dihydrotrialkylquinoline obtained by the condensation of the alkoxyanilines and a ketone.

17. The process of improving the resistance to degradation and atmospheric cracking of a butadiene-styrene emulsion copolymer rubber which comprises incorporating into the latex thereof an admixture of a major proportion of 6-ethoxy dihydrotrimethylquinoline and a minor proportion of 8-ethoxy dihydrotrimethylquinoline obtained by the condensation of para and ortho phenetidine with acetone.

18. The process of improving the resistance to degradation and atmospheric cracking of a butadiene-styrene emulsion copolymer rubber which comprises incorporating into the latex thereof an admixture of a major proportion of 6-methoxy dihydrotrimethylquinoline and a minor proportion of 8-methoxy dihydrotrimethylquinoline obtained by the condensation of para and ortho anisidine with acetone.

19. An admixture of a major proportion of 6-alkoxy dihydrotrialkylquinoline and a minor proportion of an 8-alkoxy dihydrotrialkylquinoline obtained by the condensation of the alkoxyanilines and a ketone.

20. An admixture of a major proportion of 6-ethoxy dihydrotrialkylquinoline and a minor proportion of 8-ethoxy dihydrotrialkylquinoline obtained by the condensation of para and ortho phenetidine with acetone.

References Cited in the file of this patent

UNITED STATES PATENTS

| | | |
|---|---|---|
| 1,701,144 | Clarke et al. | Feb. 5, 1929 |
| 2,165,623 | Dunbrook et al. | July 11, 1939 |